United States Patent
Won

(10) Patent No.: US 8,509,199 B2
(45) Date of Patent: Aug. 13, 2013

(54) METHOD AND SYSTEM OF DETECTING DUPLICATE SSID VIA SELF-SCANNING IN WLAN

(75) Inventor: Sang-Yeon Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 12/071,531

(22) Filed: Feb. 21, 2008

(65) Prior Publication Data

US 2008/0198826 A1 Aug. 21, 2008

(30) Foreign Application Priority Data

Feb. 21, 2007 (KR) .......................... 10-2007-0017590

(51) Int. Cl.
*H04W 4/00* (2009.01)

(52) U.S. Cl.
USPC ........... 370/338; 370/331; 370/348; 370/328; 370/329; 370/350; 370/254; 455/422.1; 455/462.2; 455/433; 455/434; 455/435.1; 455/432.2; 455/432.3; 455/449; 455/453

(58) Field of Classification Search
USPC .................. 370/338, 348, 328, 329, 350, 254, 370/248, 249, 327; 455/422.1, 426.2, 433, 455/434, 435.1, 432.2, 432.3, 449, 453
See application file for complete search history.

(56) References Cited

U.S. PATENT DOCUMENTS

| | | | | |
|---|---|---|---|---|
| 7,286,515 B2 * | 10/2007 | Olson et al. | ................... | 370/338 |
| 7,313,111 B2 * | 12/2007 | Hietalahti et al. | ............ | 370/329 |
| 7,509,131 B2 * | 3/2009 | Krumm et al. | ............. | 455/456.1 |
| 7,583,643 B2 * | 9/2009 | Smith et al. | .................... | 370/338 |
| 7,836,166 B2 * | 11/2010 | Kuan et al. | .................... | 709/224 |
| 2004/0111520 A1 * | 6/2004 | Krantz et al. | ................. | 709/229 |
| 2004/0224690 A1 * | 11/2004 | Choi et al. | .................... | 455/436 |
| 2005/0237961 A1 * | 10/2005 | Yi et al. | ........................ | 370/312 |

(Continued)

FOREIGN PATENT DOCUMENTS

| JP | 2006254209 A * | 9/2006 |
|---|---|---|
| KR | 10-2006-0047806 | 5/2006 |
| KR | 10-2006-0070570 | 6/2006 |
| WO | 2006/039081 | 4/2006 |

OTHER PUBLICATIONS

IEEE Computer Society, "IEEE Standard for Information Technology—Telecommunications and information exchange between systems—Local and metropolitan area networks—Specific requirements", Jun. 2007, IEEE, New York, NY, USA.

(Continued)

*Primary Examiner* — Ian N Moore
*Assistant Examiner* — Dung B Huynh
(74) *Attorney, Agent, or Firm* — H.C. Park & Associates, PLC

(57) ABSTRACT

A method and a system of detecting a duplicate service set identifier (SSID) via self-scanning in a WLAN are provided. An access point (AP), when a scan request is given, generates a probe request packet by inserting a SSID of the AP thereinto, transmits the probe request packet to neighbor APs, receives probe response packets, in response to the probe request packet, from the neighbor APs, detects SSIDs from the probe response packets, and informs the presence of a neighbor AP, the SSID of which is the same as that of the AP, if any of the detected SSIDs is the same as the SSID of the AP.

13 Claims, 3 Drawing Sheets

(56) References Cited

U.S. PATENT DOCUMENTS

| | | | |
|---|---|---|---|
| 2005/0282562 A1* | 12/2005 | Lee et al. | 455/458 |
| 2006/0040662 A1* | 2/2006 | Kim et al. | 455/434 |
| 2006/0092883 A1* | 5/2006 | Lee et al. | 370/332 |
| 2006/0092888 A1* | 5/2006 | Jeong et al. | 370/338 |
| 2006/0198320 A1* | 9/2006 | Hsu et al. | 370/254 |
| 2006/0223526 A1* | 10/2006 | Qi et al. | 455/432.1 |
| 2006/0268756 A1* | 11/2006 | Wang et al. | 370/310 |
| 2007/0186276 A1* | 8/2007 | McRae et al. | 726/4 |
| 2007/0286121 A1* | 12/2007 | Kolakowski et al. | 370/329 |

OTHER PUBLICATIONS

Translation of Korean Office Action issued on May 30, 2013 to Korean Patent Application No. 10-2007-0017590.

\* cited by examiner

FIG. 1

Probe Request

| Order | Information |
|---|---|
| 1 | SSID |
| 2 | Supported rates |

Probe Response

| Order | Information | Notes |
|---|---|---|
| 1 | Timestamp | |
| 2 | Beacon interval | |
| 3 | Capability Information | |
| 4 | SSID | |
| 5 | Supported rates | |
| 6 | FH Parameter Set | The FH Parameter Set Information element is present within Probe Response frames generated by STAs using frequency-hopping PHYs. |
| 7 | DS Parameter Set | The DS Parameter Set Information element is present within Probe Response frames generated by STAs using direct sequence PHYs. |
| 8 | CF Parameter Set | The CF Parameter Set Information element is only present within Probe Response frames generated by APs supporting a PCF. |
| 9 | IBSS Parameter Set | The IBSS Parameter Set Information element is only present within Probe Response frames generated by STAs in an IBSS. |

METHOD AND SYSTEM OF DETECTING DUPLICATE SSID VIA SELF-SCANNING IN WLAN

CLAIM OF PRIORITY

This application makes reference to and claims all benefits accruing under 35 U.S.C. §119 from an application for METHOD AND SYSTEM OF DETECTING DUPLICATE SSID VIA SELF-SCANNING IN WLAN earlier filed in the Korean Intellectual Property Office on Feb. 21, 2007, and there duly assigned Serial No. 10-2007-0017590.

BACKGROUND OF THE INVENTION

1. Field of the Invention

The present invention relates to an apparatus and method for TTR offset control in ADSL, more particularly, which can control TTR offset in order to remove NEXT or FEXT noise that would otherwise take place in services due to matching between ADSL and TCM-ISDN. The present invention relates to a method and a system of detecting a duplicate service set identifier (SSID) via self-scanning in a wireless local area network (WLAN).

2. Description of the Related Art

Generally, in an 802.11 WLAN infrastructure mode, an access point (AP) establishes a network using an SSID, which is the same as that of a client, in order to provide a data service to the client.

Accordingly, the client can access the AP via the SSID of the network, to which it attempts to connect, in order to be provided with a suitable data service. That is, as described in the following paragraphs, the client transmits a probe request packet and then waits for a probe response packet in order to access an AP or to scan neighbor APs.

FIG. 1 is a view illustrating a general example of a probe request packet and a probe response packet. If the SSID field of the probe request packet, received from a client, is the same as that of the SSID of an AP or is a broadcast SSID, the AP transmits a probe response packet to the client by adding its own SSID to an SSID field of the probe response packet. Accordingly, in order to scan neighbor APs, the client transmits a probe request packet to the neighbor APs by adding a broadcast SSID thereto, and then collects AP information of a corresponding channel by referring to the SSID fields of probe response packets, received from the neighbor APs. This process is referred to as active scanning scheme.

On the contrary, the client can receive beacons, which are periodically transmitted from the neighbor APs, to collect AP information of a corresponding channel by referring to the SSID in the beacons. This process is referred to as passive scanning scheme.

WLAN users generally purchase APs, which are widely distributed in the market. However, in the case that a user attempts to use a purchased AP without changing the SSID setting thereof, the SSID of the purchased AP may be the same as that of a neighbor AP. If a neighbor AP present within a service set is accidentally using the same SSID, the client would be confused to identify an AP, to which it attempts to connect. Hence, abnormal data services can be caused. That is, the client may access an incorrect AP, and thus a data service may fail due to authentication failure. The client may repeat connection between two APs having the same SSID, thereby risking the stability of the service. It is also possible that another client accesses the user AP to be freely provided with a data service.

A specific client can identify whether or not the same SSID is present by collecting neighbor AP information via active scanning or passive scanning. However, in the case of an AP having a hidden SSID, its beacon does not include SSID information. This type of AP also does not respond to a probe request, which uses a broadcast SSID.

When the client terminal scans the neighbor APs via a conventional scanning scheme, it is impossible to detect an AP having a hidden SSID. Therefore, the problem is that the presence of an AP, which has the same SSID as the user AP, cannot be identified.

SUMMARY OF THE INVENTION

It is an object of the invention to provide a method and a system of detecting a duplicate SSID via self-scanning in a WLAN, in which a specific scanning function is imparted to a client AP in order to quickly find and monitor a problem, which would take place owing to unintended presence of the same SSID, and also detect an AP having a hidden SSID, which cannot be detected using conventional scanning schemes, thereby detecting a duplicate SSID in neighbor APs.

According to an aspect of the present invention, the method of detecting a duplicate SSID in a WLAN includes steps of generating a probe request packet by inserting a service set identifier of a service access point to the probe request packet whenever a scan request is given, transmitting the probe request packet to neighbor access points, receiving probe response packets that are sent in response to the probe request packet from the neighbor access points, detecting service set identifiers included in the probe response packets, and informing presence of a neighbor access point whose service set identifier is the same as that of the service access point, if any of the detected service set identifiers is the same as the service set identifier of the service access point.

The method may further include a step of informing absence of a neighbor access point whose service set identifier is the same as that of the service access point, if none of the probe response packets is received from the neighbor access points. The method may further include a step of informing absence of a neighbor access point whose service set identifier is the same as that of the service access point, if none of the detected service set identifiers of the probe response packets is the same as the service set identifier of the service access point. The step of receiving probe response packets may further include a step of collecting the probe response packets for about 500 milliseconds. The scan request given to the access point is made by a client or a user.

According to another aspect of the present invention, the system of detecting a duplicate SSID in a WLAN includes a service access point (AP). The service AP generates a probe request packet by inserting a service set identifier of the service access point to the probe request packet whenever a scan request is given, transmits the probe request packet to neighbor access points, receives probe response packets that are sent in response to the probe request packet from the neighbor access points, detects service set identifiers of the probe response packets, and informs presence of a neighbor access point whose service set identifier is the same as that of the service access point if any of the detected service set identifiers is the same as the service set identifier of the service access point.

The service AP may include a packet transceiver for transmitting the probe request packet to the neighbor access points in response to the scan request from a user and for receiving the probe response packets sent in response to the probe request packet from the neighbor access points, a packet collector for collecting the probe response packets in order to acquire information of the neighbor access points, a duplicate service set identifier detector for detecting service set identifier fields of the probe response packets collected by the packet collector where the duplicate service set identifier detector determining whether or not any of the detected service set identifiers of the probe response packets is the same as the service set identifier of the service access point, and a duplicate service set identifier result reporter for informing a result from the duplicate service set identifier detector to the user.

The packet collector may operate to collect the packets whenever the user sets a SSID or in the event of abnormal data service.

The service access point may include a packet transceiver for receiving beacons transmitted from the neighbor access points, a packet collector for scanning the neighbor access points in order to acquire information of the neighbor access points, a duplicate service set identifier detector for detecting service set identifier fields of the received beacons where the duplicate service set identifier detector determining whether or not any of the detected service set identifiers of the beacons is the same as the service set identifier of the service access point, and a duplicate service set identifier result reporter for informing a result from the duplicate service set identifier detector to the user.

The service access point may broadcast the probe request packet in a predetermined channel. The service access point is coupled to a user terminal, and the scan request is given by the user terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a view illustrating a general example of a probe request packet and a probe response packet;

DETAILED DESCRIPTION OF THE PREFERRED EMBODIMENTS

Figure 2:
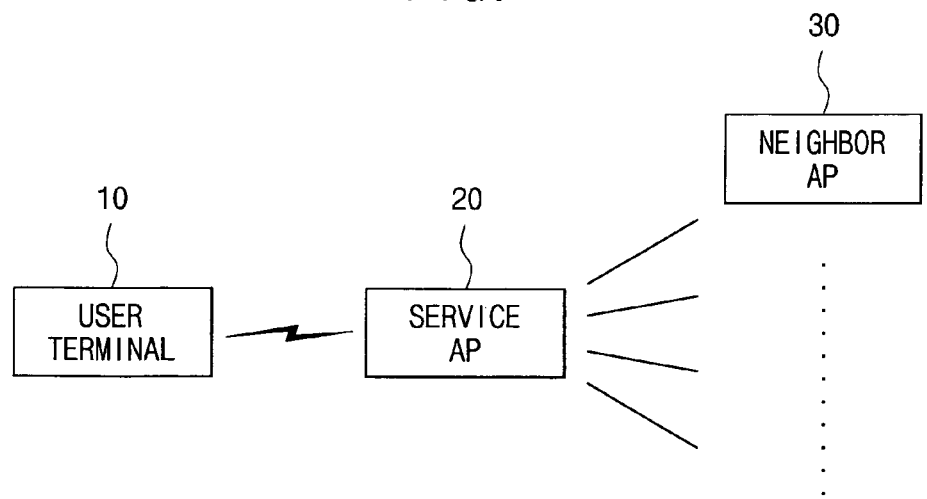
FIG. 2 is a block diagram schematically illustrating a system of detecting a duplicate SSID via self-scanning in a WLAN.

The present invention will now be described more fully hereinafter with reference to the accompanying drawings, in which preferred embodiments thereof are shown. Reference now should be made to the drawings, in which the same reference numerals and signs are used throughout the different drawings to designate the same or similar components. In the following description of the present invention, a detailed description of known functions and components incorporated herein will be omitted when it may make the subject matter of the present invention rather unclear.

Figure 3:
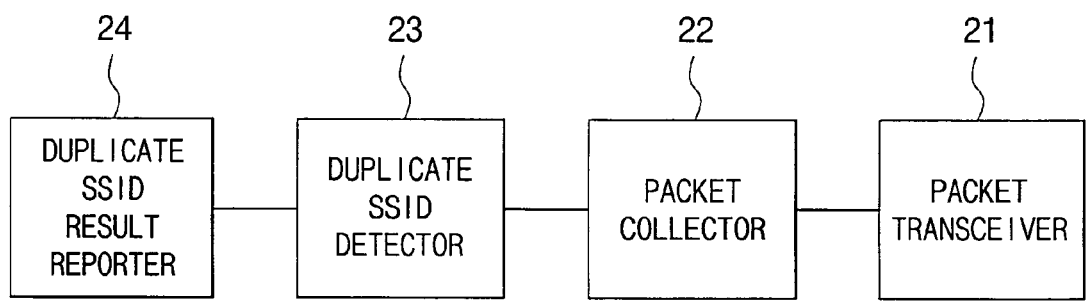
FIG. 3 is a block diagram illustrating the structure of the service AP of the system shown in FIG. 2.

FIG. 2 is a block diagram schematically illustrating a system of detecting a duplicate SSID via self-scanning in a WLAN, and FIG. 3 is a block diagram illustrating the structure of the service AP of the detection system shown in FIG. 2.

As shown in FIGS. 2 and 3, the detection system of the present invention includes a user terminal 10, a service AP 20 for providing a data service to the user terminal 10 and a plurality of neighbor APs 30 for transmitting/receiving packets to/from the service AP 20. The user terminal 10 sends a scan request to the AP 20 in a service set. In response to the scan request from the user terminal 10, the service AP 20 generates a probe request packet by inserting the SSID of the AP 20 thereinto, sends the probe request packet to the neighbor APs 30, and then collects probe response packets, sent in response to the probe request packet from the neighbor APs 30. The time period for collecting the probe response packets is about 500 ms.

When the service AP 20 receives the probe response packets from the neighbor APs 30, it detects SSIDs from all the received probe response packets. If one of the detected SSIDs is the same as the SSID of the service AP 20, the service AP informs the client of the presence of an AP that uses the same SSID. However, if a probe response packet is not received or the same SSID does not exist, the service AP 20 informs the user terminal 10 of the absence of an AP that uses the same SSID.

In more detail, as shown in FIG. 3, the service AP 20 includes a packet transceiver 21, a packet collector 22, a duplicate SSID detector 23 and a duplicate SSID result reporter 24.

In response to a scan request from the user, the packet transceiver 21 transmits a probe request packet to neighbor APs and receives probe response packets therefrom.

The packet collector 22 collects packets by scanning the neighbor APs using a self-scanning scheme. The packet collector 22 operates to collect packets whenever the user sets an SSID or in the event of an abnormal data service. That is, the packet collector 22 can collect packets to acquire information on the neighbor APs in accordance with a passive scanning scheme or a self-scanning scheme. In the passive scanning scheme, the packet collector 22 scans the neighbor APs 30 by receiving beacons, which are periodically transmitted from the neighbor APs 30. In the self-scanning scheme, the packet collector 22 generates a probe request packet using its own SSID (the SSID of the service AP) in order to scan the neighbor APs based on responses.

Particularly, in the self-scanning scheme, an SSID set to a user AP (service AP) is inserted into an SSID field in a probe request frame, which is then broadcast to neighbor APs in a corresponding channel. When the probe request frame is received by the neighbor APs, if the SSID of any of the neighbor APs is the same as the SSID in the probe request frame, the neighbor AP having the same SSID transmits a probe response packet to the user AP by inserting its own SSID thereinto. Accordingly, the user AP can collect neighbor AP information based upon the SSID information of received probe response packets.

The duplicate SSID detector 23 detects SSID fields from all the packets, collected by the packet collector 22, and conducts inspection to detect any duplicate SSID that is the same as the SSID of the service AP 20. That is, the duplicate SSID detector 23 identifies the presence of an AP, the SSID of which is the same as that of the service AP 20, using the neighbor AP information, which is collected by the packet collector 22, and sends an identification result (i.e., a duplicate SSID detection result) to the duplicate SSID result reporter 24.

The duplicate SSID result reporter 24 reports the duplicate SSID detection result, sent from the duplicate SSID detector 23, to the user.

More specifically, if any of the SSIDs, detected by the duplicate SSID detector 23, is the same as the SSID of the service AP 20, the duplicate SSID result reporter 24 informs the user of the presence of the AP that uses the same SSID. If any of the SSIDs, detected by the duplicate SSID detector 23, is not the same as the SSID of the service AP 20, the duplicate SSID result reporter 24 informs the user of the absence of the AP that uses the same SSID.

Figure 4:
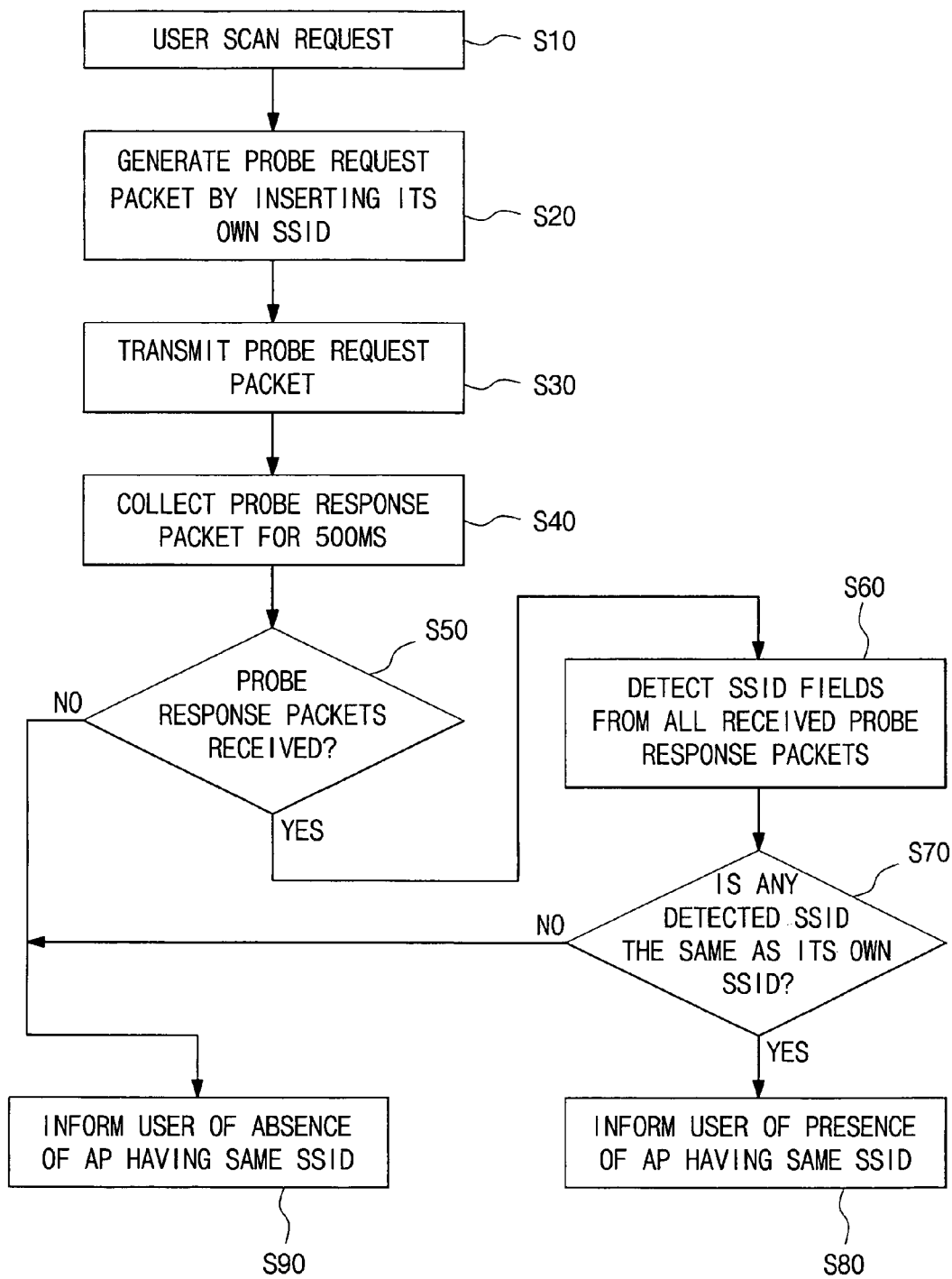
FIG. 4 is a flowchart illustrating a process of detecting a duplicate SSID via self-scanning in a WLAN according to the invention.

FIG. 4 is a flowchart illustrating a process of detecting a duplicate SSID via self-scanning in a WLAN according to the invention. As shown in FIG. 4, at first, a client sends a user scan request to an AP in a service set (S10). The scan request can also be checked directly by a user in the AP, in place of the client. In response to the scan request from the client, the AP in the service set generates a probe request packet by inserting its own SSID thereinto (S20), and transmits the generated probe request packet to neighbor APs (S30). The AP in the service set collects probe response packets, in response to the probe request packet, from the neighbor APs for about 500 ms (S40).

The AP in the service set determines whether or not the probe packets are received from the neighbor APs (S50), and if the probe response packets are received from the neighbor APs, detects SSIDs from all the probe response packets received therefrom (S60).

Next, the service AP determines whether or not any of the detected SSIDs is the same as its own SSID (S70), and if the same SSID is present, informs the client of the presence of an AP that uses the same SSID (S80).

If it is determined, in the step S50 of determining whether or not the probe packets are received from the neighbor APs, that no probe response packets are received, or it is determined, in the step S70 of determining whether or not any of the detected SSIDs is the same as its own SSID, that the same SSID is absent, the service AP informs the client of the absence of the AP that uses the same SSID (S90).

As set forth hereinbefore, the service AP can detect the presence of an AP, which has a hidden SSID, by transmitting the probe request packet having the SSID of the service AP and then acquiring neighbor AP information using the probe response packets, received from the neighbor APs. Accordingly, the user can readily understand a problem in a data service, which would take place due to the presence of a duplicate SSID. Therefore, the self-scanning scheme of the invention makes it possible to scan all the APs irrespective of their SSID types, which are set visibly or invisibly.

Although it is impossible for a client terminal to scan and detect APs having a hidden SSID in a WLAN, the self-scanning scheme of the invention makes it possible to detect the hidden SSID of neighbor APs.

According to the invention as set forth above, since a scanning function is imparted to the client AP, it is possible to prevent an unstable network service, which would take place due to the presence of a neighbor AP using the same SSID. It is also possible to prevent a bandwidth decrease or a fee problem, which would be caused by others using the network of the user.

Furthermore, the self-scanning scheme of the invention makes it possible to detect an AP using a hidden SSID, which would not be detected by conventional scanning schemes, and also to solve uncertain network problems, which would be caused by the hidden SSID, thereby improving the reliability of a product.

While the present invention has been shown and described in connection with the preferred embodiments, it will be apparent to those skilled in the art that modifications and variations can be made without departing from the spirit and scope of the invention as defined by the appended claims.

What is claimed is:

1. A method of detecting a duplicate service set identifier in a wireless local area network, the method comprising:
   generating a probe request packet by inserting a service set identifier of a service access point in the probe request packet in response to a scan request;
   transmitting the probe request packet to neighbor access points;
   receiving probe response packets;
   detecting service set identifiers included in the probe response packets;
   determining, by the service access point, a presence of a neighbor access point having a service
   set identifier that is the same as the service set identifier of the service access point in response to at least one of the detected service set identifiers of at least one of the neighbor access points being the same as the service set identifier of the service access point;
   receiving beacons transmitted from the neighbor access points;
   scanning the neighbor access points to acquire information of the neighbor access points;
   detecting service set identifier fields of the received beacons;
   determining whether any of the detected service set identifiers of the beacons is the same as the service set identifier of the service access point; and
   transmitting a result of the determining to a user.

2. The method according to claim 1, further comprising:
   determining an absence of a neighbor access point having a service set identifier that is the same as the service set identifier of the service access point in response to no probe response packet being received from the neighbor access points.

3. The method according to claim 1, further comprising:
   determining an absence of a neighbor access point having a service set identifier that is the same as the service set identifier of the service access point in response to none of the detected service set identifiers of the probe response packets being the same as the service set identifier of the service access point.

4. The method according to claim 1, wherein receiving the probe response packets comprises collecting the probe response packets for about 500 milliseconds.

5. The method according to claim 1, wherein a client or user generates the scan request transmitted to the service access point.

6. A system of detecting a duplicate service set identifier in a wireless local area network, the system comprising:
   a service access point to generate a probe request packet by inserting a service set identifier of the service access point in the probe request packet in response to a scan request, to transmit the probe request packet to neighbor access points, to receive probe response packets from the neighbor access points, to detect service set identifiers of the probe response packets, and to determine a presence of a neighbor access point having a service set identifier that is the same as the service set identifier of the service access point in response to at least one of the detected service set identifiers of at least one of the neighbor access points being the same as the service set identifier of the service access point, wherein the service access point comprises:
- a packet transceiver to receive beacons transmitted from the neighbor access points;
- a packet collector to scan the neighbor access points to acquire information of the neighbor access points;
- a duplicate service set identifier detector to detect service set identifier fields of the received beacons, and to determine whether any of the detected service set identifiers of the beacons is the same as the service set identifier of the service access point; and
- a duplicate service set identifier result reporter to transmit a result of the determination by the duplicate service set identifier detector, from the duplicate service set identifier detector to a user.

7. The system according to claim 6, wherein the service access point determines an absence of a neighbor access point having a service set identifier that is the same as the service set identifier of the service access point in response to no probe response packet being received from the neighbor access points.

8. The system according to claim 6, wherein the service access point determines an absence of a neighbor access point having a service set identifier that is the same as the service set identifier of the service access point in response to none of the detected service set identifiers being the same as the service set identifier of the service access point.

9. The system according to claim 6, wherein the service access point collects the probe response packets for 500 milliseconds.

10. The system according to claim 6, wherein the service access point comprises:
- a packet transceiver to transmit the probe request packet to the neighbor access points in response to the scan request, and to receive the probe response packets from the neighbor access points;
- a packet collector to collect the probe response packets to acquire information of the neighbor access points;
- a duplicate service set identifier detector to detect the service set identifier fields of the probe response packets collected by the packet collector, and to determine whether any of the detected service set identifiers of the probe response packets is the same as the service set identifier of the service access point; and
- a duplicate service set identifier result reporter to transmit a result of the determination by the duplicate service set identifier detector, from the duplicate service set identifier detector.

11. The system according to claim 10, wherein the packet collector collects the probe response packets in response to a service set identifier being set or in response to an event of abnormal data service.

12. The system according to claim 6, wherein the service access point broadcasts the probe request packet in a channel.

13. The system according to claim 6, wherein the service access point is coupled to a terminal, and the scan request is transmitted by the terminal.

* * * * *